(12) United States Patent
Aurin

(10) Patent No.: US 9,177,019 B2
(45) Date of Patent: Nov. 3, 2015

(54) COMPUTER SYSTEM FOR OPTIMIZING THE PROCESSING OF A QUERY

(75) Inventor: Matthias Aurin, Heidelberg (DE)

(73) Assignee: SAP SE, Walldorf (DE)

( * ) Notice: Subject to any disclaimer, the term of this patent is extended or adjusted under 35 U.S.C. 154(b) by 1536 days.

(21) Appl. No.: 12/468,647

(22) Filed: May 19, 2009

(65) Prior Publication Data

US 2010/0299337 A1    Nov. 25, 2010

(51) Int. Cl.
*G06F 17/30* (2006.01)
(52) U.S. Cl.
CPC ................ *G06F 17/30442* (2013.01)
(58) Field of Classification Search
CPC ............................................ G06F 17/30442
USPC .................................. 707/715, 718
See application file for complete search history.

(56) References Cited

U.S. PATENT DOCUMENTS

| | | | |
|---|---|---|---|
| 5,960,423 A * | 9/1999 | Chaudhuri et al. ........... 707/715 |
| 6,266,658 B1 * | 7/2001 | Adya et al. ............. 707/999.001 |
| 7,031,958 B2 * | 4/2006 | Santosuosso .......... 707/999.003 |
| 7,130,838 B2 * | 10/2006 | Barsness et al. ....... 707/999.002 |
| 7,774,336 B2 * | 8/2010 | Beyer et al. ................. 707/718 |
| 2003/0093408 A1 * | 5/2003 | Brown et al. ..................... 707/2 |
| 2004/0054683 A1 * | 3/2004 | Nishizawa et al. ........... 707/102 |
| 2007/0250517 A1 * | 10/2007 | Bestgen et al. ............... 707/100 |

OTHER PUBLICATIONS

Brian Babcock & Surajit Chaudhuri, "Towards a Robust Query Optimizer: A Principled and Practical Approach", ACM SIGMOD 2005, Jun. 14-16, 2005, pp. 119-130.*
Oracle Corporation, "Query Optimization in Oracle Database 10g Release 2: An Oracle White Paper", Jun. 2005.*
Business Wire, "Teradata and SAP Join Forces to Deliver Strategic Enterprise Analytical Solutions", Jan. 26, 2004, p. 1.*

* cited by examiner

*Primary Examiner* — Scott A Waldron
(74) *Attorney, Agent, or Firm* — Kenyon & Kenyon LLP

(57) ABSTRACT

A computer system including a database having a database table for storing records including first columns for storing data values, and at least one second column for storing keys identifying records stored in the database. The computer system also including a set of index tables with each having assigned thereto an index table identifier, an arrangement for receiving a query an arrangement for storing a predefined ordered sequence of index table identifiers, and an arrangement for processing the query by checking each one of the index tables for being relevant for the execution of the query, storing the index table identifier for each relevant index table in a query execution table, sorting the query execution table in accordance with the predefined ordered sequence, and executing the query using the index tables identified in the query execution table in the order given by the sorting of the query execution table.

12 Claims, 4 Drawing Sheets

COMPUTER SYSTEM FOR OPTIMIZING THE PROCESSING OF A QUERY

FIELD OF THE INVENTION

The present invention relates to the field of data processing, and more particularly to a computer system for processing a database query.

BACKGROUND AND RELATED ART

A database typically consists of one or more database tables for storing data values. Records that are stored in the database can be accessed using a key. In order to increase the speed of reading a desired record from a database table the use of index tables is as such known. An index table relates data values of at least one data field of the database table to keys of records that contain a given data value for that data field. For execution of a query specifying a certain data value or range of data values for one of the data fields the respective index table is thus used in order to look up the keys of records that correspond to the specified search criterion. Once the access keys have been obtained from the index table the respective records can be read instantaneously from the database.

SUMMARY OF THE INVENTION

The present invention provides for a computer system comprising a database having a database table for storing records comprising data values, the database table having first columns for storing the data values, each one of the first columns being assigned to a data field of a set of predefined data fields, and at least one second column for storing keys, each key identifying one of the records stored in the database, and a set of index tables, each index table being assigned to one of the data fields and having assigned thereto an index table identifier, means for receiving a query, the query specifying the subset of the set of data fields and a search range for each specified data field, means for storing a predefined ordered sequence of index table identifiers, means for processing the query by checking each one of the index tables for being relevant for the execution of the query, one of the index tables being relevant if the one of the index tables is assigned to one of the specified data fields, storing the index table identifier for each relevant index table in a query execution table, sorting the query execution table in accordance with the predefined ordered sequence, executing the query using the index tables identified in the query execution table in the order given by the sorting of the query execution table.

Embodiments of the invention are particularly advantageous as the index tables that are relevant for the execution of a query are first identified and then sorted in accordance with a predefined ordered sequence. A sorted query execution table is generated that contains the index table identifiers of the relevant index tables. The query is then executed by sequentially using the index tables in the order given by the sorted query execution table. It is to be noted that the term "index table" as used herein does also encompass equivalent data sources.

In accordance with an embodiment of the invention, the ordered sequence of index table identifiers can be updated in order to reflect the actual status of the database and in particular the actual sizes of the various index tables. The updating operation for updating the ordered sequence can be performed by a query optimization means that determines the actual sizes of all index tables and sorts the index tables by size. As a result, an updated ordered sequence of index table identifiers is obtained and used for consecutive queries until the next updating operation occurs.

In accordance with an embodiment of the invention, the ordered sequence of index table identifiers is updated at regular or irregular time intervals. For example, the query optimization means is invoked at pre-programmed points of time when the load of the database is usually low, such as during the night. This way a negative impact on the execution of the updating operation on the database response time is avoided. Alternatively or in addition the time intervals after which an updating operation is executed can be determined dynamically, such as by monitoring the database load. When the database load is high this typically implies that the sizes of the index tables vary with a relatively high frequency. The time intervals between update operations are chosen inversely proportional to the database load in order to reflect the changed index table sizes in the predefined ordered sequence used for sorting relevant index tables for the execution of queries. The database load can be measured such as by the average write access operations to the database per time unit. This is particularly advantageous as a write access to the database typically implies that one or more of the index tables receives an additional entry and thus changes its size.

In accordance with an embodiment of the invention the means for receiving are adapted to receive a data structure as part of the query, the data structure containing data field names of at least some of the specified data fields, a search range for each one of the data field names and a Boolean term specifying a relation between the data field names, and further comprising means for transforming the data structure into a character string, wherein the means for processing the query are operable to use the character string for execution of the query.

Embodiments of the invention are particularly advantageous as the specification of the query by means of a data structure provides a high degree of flexibility to the user, such as to include non-standard data fields into the query. In particular, the database can be customized by adding one or more custom data fields without a requirement of modifying the computer program. This is accomplished by parsing the data structure and transforming the data structure into a character string which is then used as an argument for the execution of a database select command. By execution of the select command the database is searched for records that match the query specified in the character string.

In accordance with an embodiment of the invention, a mapping table is received as part of the query from the user interface. The mapping table specifies a mapping of a result returned by the query to one or more elements of the user interface. This is particularly beneficial if there is not a one-to-one relationship between the data output fields of the user interface and the data fields of the database. The mapping table can specify how data values returned by the query for specified ones of the data fields are mapped onto one or more output fields of the user interface providing utmost flexibility regarding the design of the user interface. This has the further advantage of executing the mapping on the side of the database and not by the client computer that runs the user interface further reducing the latency time experienced by the user for the execution of the query.

In accordance with embodiments of the invention the set of database hits that results from execution of the query is further narrowed down before a result is returned. For example, one or more criteria are provided by the user interface together with the query. The set of hits returned from the database in response to the query is filtered using the one or more criteria in order to return only those hits that fulfill the one or more criteria.

In accordance with an embodiment of the invention, the computer system is an enterprise resource planning (ERP) system. Each record of the database can constitute a document, such as a posting document.

Embodiments of the present invention are particularly advantageous as a flexible application programming interface (API) is provided that enables the execution of queries with minimal response time while allowing to include custom data fields into the query without having to modify the programming. In particular the set of data fields that can serve as possible selection criteria is not hard coded by can be extended on-the-fly.

Furthermore, a desired maximum number of hits can be specified in the query. When this maximum number of hits has been reached during the execution of the query, the execution is interrupted and the internal state of the database search execution at this point is stored temporarily. The results are returned to the requesting user interface. When the user wants to view more results a respective command is sent from the user interface to the computer system such that execution of the query is resumed in order to provide more hits to the user.

BRIEF DESCRIPTION OF THE DRAWINGS

In the following embodiments of the invention are described by way of example only making reference to the drawings in which.

DETAILED DESCRIPTION

Figure 1:
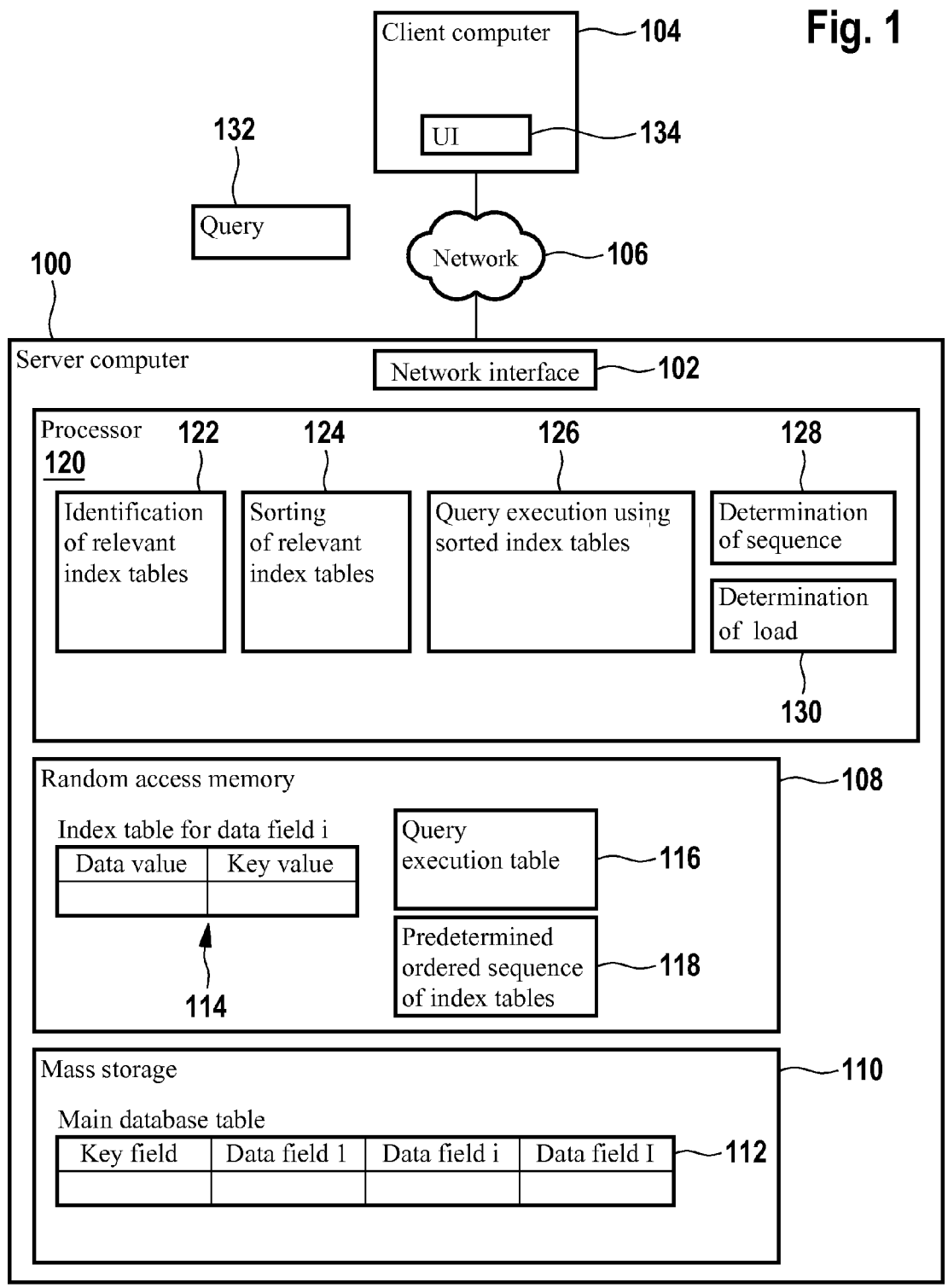
FIG. 1 is a block diagram of an embodiment of a computer system of the invention.

In the following like elements are designated by identical reference numerals throughout the various embodiments.

FIG. 1 shows a server computer 100 that has a network interface 102 for coupling to a client computer 104 via a network 106. Further, the server computer 100 has at least one processor 120, a random access memory 108 that constitutes the main memory of the server computer 100 and mass storage 110. The random access memory 108 and the mass storage 110 serve for storage of a database that is constituted by at least one main database table 112 and a plurality of index tables 114.

In the embodiment considered here the database table 112 has a number of I+1 columns for a number of I data fields i, where $1 \leq i \leq I$. In addition, the database table 112 has one column for storing keys. Each row of the database table 112 constitutes a record and the key that is stored in that row can be used to read the respective record from the database table 112. The database table 112 can be stored in the random access memory 108 or in the mass storage 110, as it is shown in the embodiment of FIG. 1. Typically the database table 112 is stored in the mass storage 110 due to its size.

Each one of the index tables 114 is assigned to one of the data fields i. One of the index tables 114 that is assigned to one of the data fields i is designated as index table i in the following.

The index table i has a column for storing data values of the data field i that occur in at least one of the various records of the database table 112 and an additional column for storing the keys of records having that data value in the data field i. Hence, for retrieving all records from the database table 112 having a specified data value in their data field i it is not necessary to search the database table 112 but to directly read the respective keys of the records that fulfill this criterion from the index table i for quick access. An index table i may exist for some or all of the data fields i. The index tables 114 are preferably stored in the random access memory 108 in order to further reduce the latency time experienced by a user.

Further, a query execution table 116 is stored in the random access memory 108. The query execution table is initially empty and it serves to receive index table identifiers in order to provide a query execution plan when a query is to be executed. The query execution table 116 can be sorted in accordance with a predetermined ordered sequence 118 of index table identifiers for optimization of the query execution plan specified by the query execution table 116.

The server computer 100 has at least one processor 120 for execution of program modules 122, 124, 126, 128 and 130.

The program module 122 serves to identify a subset of the index tables 114 that is relevant for execution of a query 132 received via the network 106 from the client computer 104. This determination is performed by the program module 122 such as by calling a method that returns the names of all available index tables 114. Each one of these index tables 114 is checked whether it is assigned to one of the data fields specified in the query 132. Those index tables that are assigned to a data field that is contained in the query 132 are by definition relevant for execution of the query 132. An identifier for each one of the relevant index tables is put into the query execution table 116 by the program module 122. This identifier can be the index i or another index table name.

The program module 124 serves to sort the query execution table 116 in accordance with the ordered sequence 118 for optimization of the query execution plan specified by the query execution table 116.

The program module 128 serves to determine the ordered sequence 118. For example, a standard ordered sequence 118 is stored when the server computer 100 is initialized, such as during a so called built-time. This standard ordered sequence 118 can be adapted to the actual status of the server computer 100 and in particular to the size distribution of its index tables 114 by means of the program module 128.

The program module 128 determines the sizes of all index tables 114 and sorts the index tables 114 by size. The program module 128 outputs an updated ordered sequence 118 that contains the identifiers of the index tables 114 in the order given by the sorting and overrides the previous ordered sequence 118 in the random access memory 108 to complete the updating operation. The program module 128 can be started in order to perform such an update operation at predefined, regular or irregular points of time depending on the implementation. For example, the program module 128 can be started automatically outside regular business hours in order to execute the updating operation without negatively impacting the response time experienced by the users.

In one embodiment, the processor 120 serves for execution of a program module 130 that determines the load of the database. The load can be determined by calculating the average number of database operations, such as database write operations, within a given time period. If the load is high the frequency of the updating operations is increased as the sizes of the index tables 114 changes more quickly when the load is high. Hence, the duration of the time intervals between the updating operations is chosen by the program module 130 inversely proportionally to the determined load. The program module 130 can invoke the program module 128 to perform the updating operations in accordance with the updating schedule determined by the program module 130 in accordance with the determined load.

The client computer 104 has a user interface program 134 that serves to enter the query 132 and to receive the results returned in response to the query 132 by the server computer 100, such as a hit list of the records that have been identified by execution of the query 132.

In operation, the server computer 100 receives the query 132 via the network 106 by the network interface 102. This invokes the program module 122. The program module 122 determines the data fields that are specified in the query and identifies the relevant index tables that are assigned to one of the data fields specified in the query 132.

The resultant query execution table 116 is then sorted by execution of the program module 124 that uses the ordered sequence 118 for performing the sorting operation. Next, the program module 126 is executed for executing the query 132 using the sorted query execution table 116. In other words, the query 132 is executed by the program module 126 by accessing the index tables identified in the query execution table 116 in the order given by the query execution table 116. After execution of the query 132 a result containing the hit list of the records that match the query 132 is returned from the server computer 100 to the client computer 104 via the network 106.

The query 132 specifies at least one, a plurality or all of the data fields i and a search range for each one of the specified data fields. The search range can be an individual value, alternative values or a continuum of values a given data field i needs to have in order to produce a database hit. The various data fields specified in the query 132 can be related by logical operators in order to form a Boolean term.

Figure 2:
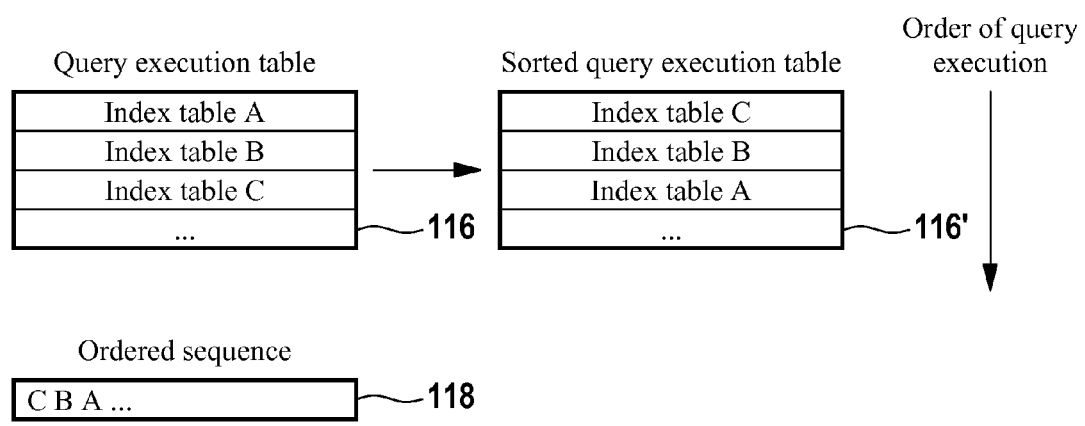
FIG. 2 is illustrative of the sorting of a query execution table in accordance with a predefined ordered sequence of index table identifiers.

FIG. 2 illustrates the optimization of the query execution plan. Initially, the query execution table 116 contains the identifiers of the relevant index tables in an arbitrary order. For example, the query execution table 116 contains the index table identifiers for index table A, index table B, index table C, . . . . The index tables that are identified by their respective index table names in the execution table 116 have been determined by the program module 122 to be relevant for the execution of a given query 132. By execution of the program module 124 the query execution table 116 is sorted in accordance with the ordered sequence 118 to provide the sorted query execution table 116'. In the example considered here the ordered sequence 118 is C, B, A, . . . the sorted query execution table 116' constitutes an optimized query execution plan by specifying the order in which the index tables identified in the sorted query execution table 116' are to be used for execution of the query 132.

Figure 3:
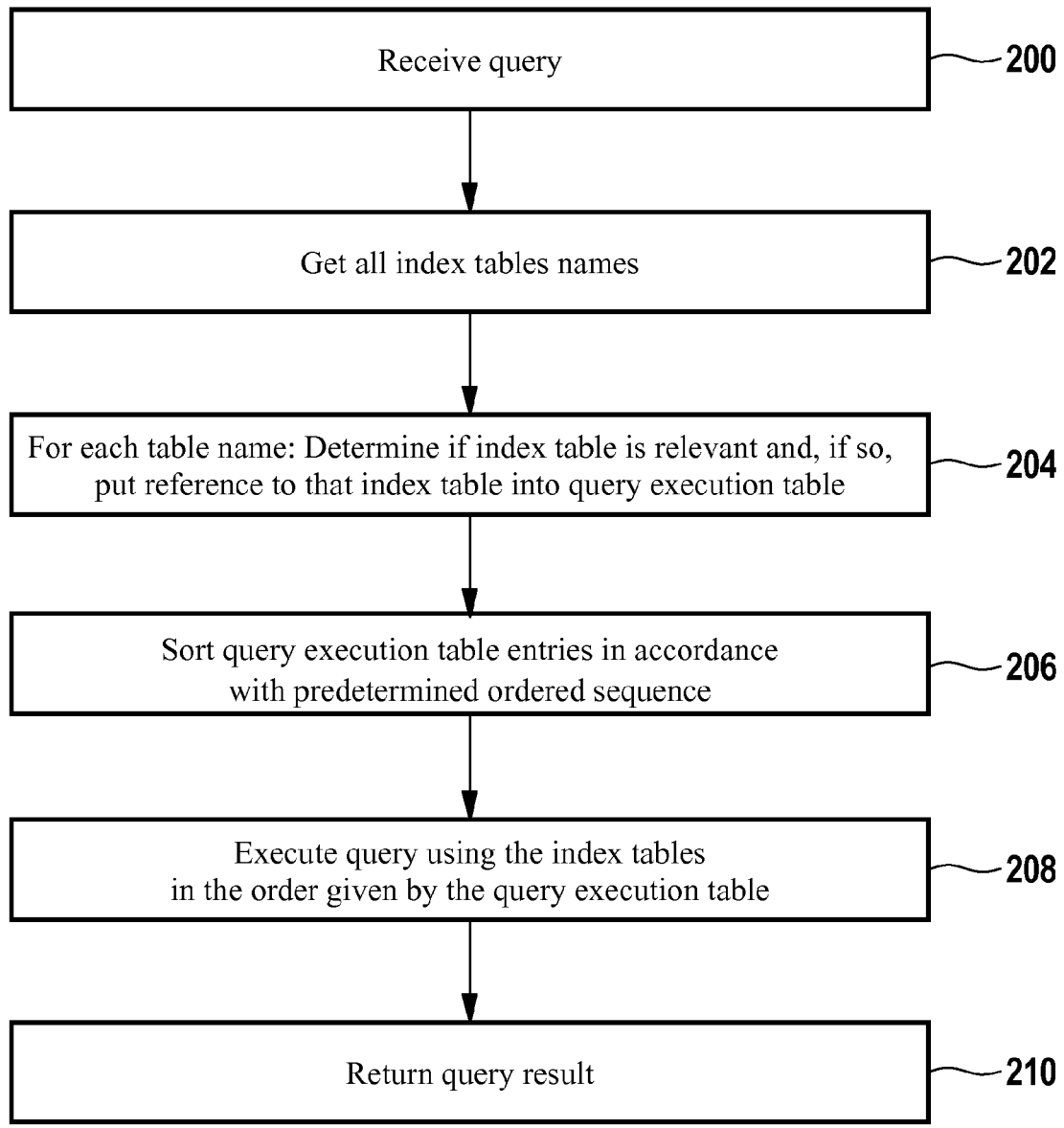
FIG. 3 is a flowchart of an embodiment of a method of the invention.

FIG. 3 shows a respective flowchart. In step 200 a query 132 is received by the server computer 100. In step 202 all index tables' names are obtained by the server computer 100 by calling a respective method. The following step 204 is a loop over all index table names. For each index table it is checked whether the index table is relevant for execution of the query and, if so, the index table identifier of that relevant index table is added to the query execution table 116. As a result of step 204 the query execution table 116 is provided that contains index table identifiers of all relevant index tables.

In step 206 the query execution table 116 is sorted in accordance with the predetermined ordered sequence 118. This provides the sorted query execution table 116'.

Next, in step 208, the query 132 is executed using the sorted query execution table 116' by using the relevant index tables identified in the query execution table 116' in the order specified by the query execution table 116'. In step 210 the query result is returned by the server computer 100 to the client computer 104 in response to the query 132 such that the query result can be displayed on the user interface 134.

Figure 4:
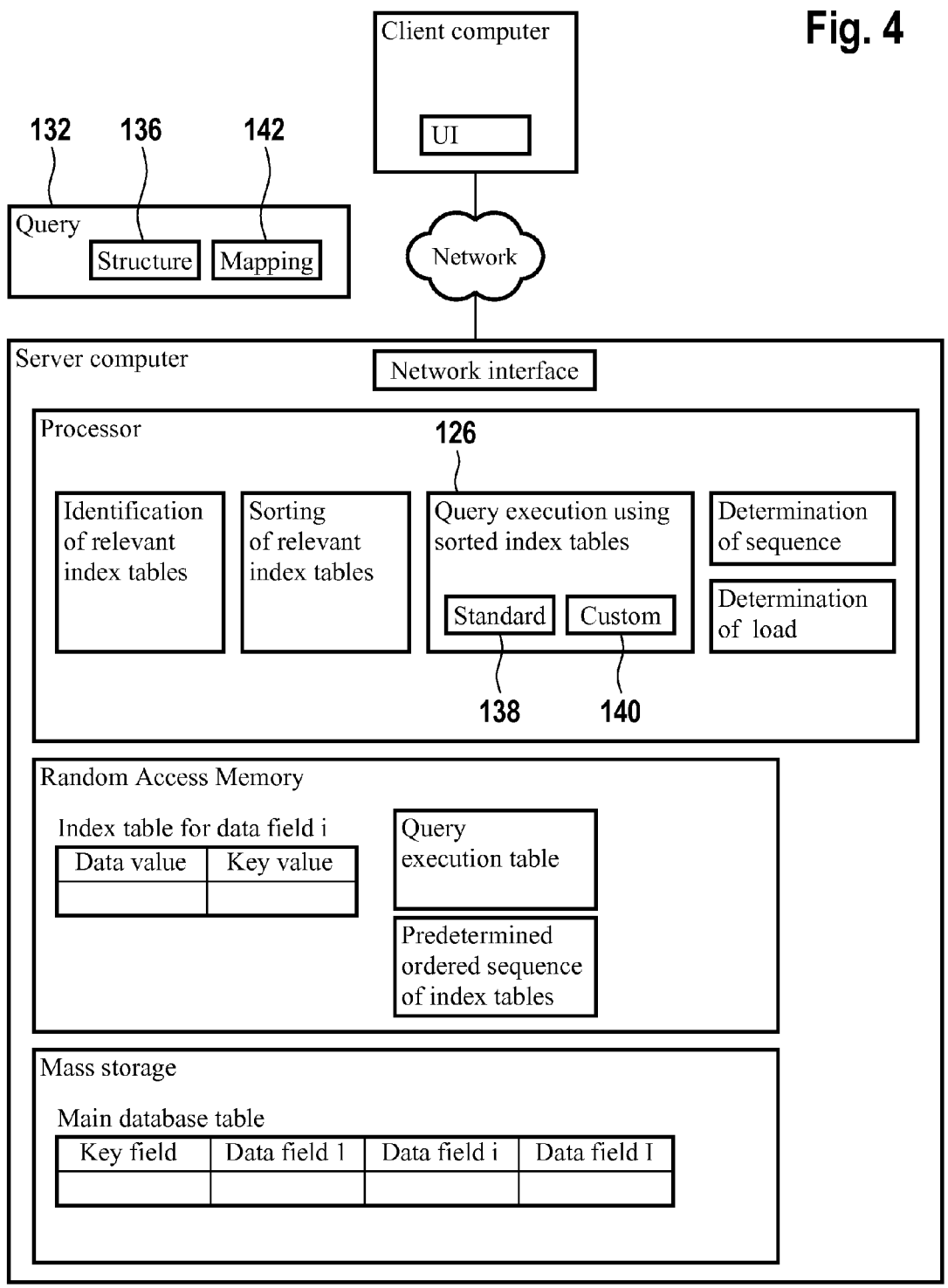
FIG. 4 is a block diagram of a further embodiment of a computer system of the invention.

In the embodiment of FIG. 4 the program module 126 has a component 138 containing executable instructions for processing the query 132 as far as standard data fields are concerned and a component 140 for processing the query 132 as far as non-standard, custom data fields are concerned. Such custom data fields can be added by the customer to the database in accordance with the customer's needs The query 132 can contain a data structure 136 that specifies a portion of the query being constituted by custom data fields. The data structure 136 specifies the custom data fields to be included in the query, a range for each one of the custom data fields to be included in the query 132 and logical operators relating the individual custom data fields to form a Boolean term.

The program module 126 transforms the portion of the query contained in the structure 136 into a string. That string is put into a select command of program module 140 to serve as an argument for execution of the select command returning a set of hits matching the portion of the query specified by the string. Another portion of the query that is composed of standard data fields is executed by the component 138 and returns another set of hits. The set of hits returned by the component 138 and by the component 140 are combined in accordance with the query 132 to provide the final hit list that is returned as a result.

Further, the query 132 can contain a mapping table 142 that specifies a mapping of one or more of the data fields i to one or more of the output fields contained in the user interface 134. The mapping can encompass reformatting of the data values contained in these data fields and/or another kind of transformation.

| List of Reference Numerals | |
| --- | --- |
| 100 | Server computer |
| 102 | Network interface |
| 104 | Client computer |
| 106 | Network |
| 108 | Random access memory |
| 110 | Mass storage |
| 112 | Database table |
| 114 | Index tables |
| 116 | Query execution table |
| 118 | Ordered sequence |
| 120 | Processor |
| 122 | Program module |
| 124 | Program module |
| 126 | Program module |
| 128 | Program module |
| 130 | Program module |
| 132 | Query |
| 134 | User interface |
| 136 | Data structure |
| 138 | Component |
| 140 | Component |
| 142 | Mapping table |

I claim:

1. A computer system comprising:
 a database having a database table for storing records comprising data values, the database table having first columns for storing the data values, each one of the first columns being assigned to a data field of a set of predefined data fields, and at least one second column for storing keys, each key identifying one of the records stored in the database, and a set of index tables, each index table being assigned to one of the data fields and having assigned thereto an index table identifier, means for receiving a query, the query specifying a subset of the set of data fields and a search range for each specified data field, means for storing a predetermined ordered sequence of index table identifiers, and means for processing the query by checking each one of the index tables for being relevant for the execution of the query, one of the index tables being relevant if the one of the index tables is assigned to one of the specified data fields, storing the index table identifier for each relevant index table in a query execution table, sorting the query execution table in accordance with the predetermined ordered sequence, executing the query using the index tables identified in the query execution table in the order given by the sorting of the query execution table.

2. The computer system of claim 1, further comprising query optimization means for determining the ordered sequence, the ordered sequence being determined by determining the sizes of all index tables and sorting the index tables by size.

3. The computer system of claim 2, the query optimization means being operable for determining the ordered sequence at consecutive time intervals.

4. The computer system of claim 3, further comprising load determination means for determining a load parameter of the database, wherein the duration of the time intervals is inversely proportional to the load determined by the load determination means.

5. The computer system of claim 1, the means for receiving the query being adapted to receive a data structure as part of the query, the data structure containing data field names of at least some of the specified data fields, a search range for each one of the data field names and a Boolean term specifying a relation between the data field names, and further comprising means for transforming the data structure into a character string, wherein the means for processing the query are operable to use the character string for execution of the query.

6. The computer system of claim 1, the means for receiving the query being operable to receive a mapping table as part of the query from a user interface, the mapping table specifying a mapping of a result returned by the query to one or more elements of the user interface.

7. The computer system of claim 4, the means for receiving the query being operable to receive a mapping table as part of the query from a user interface, the mapping table specifying a mapping of a result returned by the query to one or more elements of the user interface.

8. A computer-implemented method for performing a database query, the database having a database table for storing records comprising data values, the database table having first columns for storing the data values, each one of the first columns being assigned to a data field of a set of predefined data fields, and at least one second column for storing keys, each key identifying one of the records stored in the database, and a set of index tables, each index table being assigned to one of the data fields and having assigned thereto an index table identifier, the method comprising:

receiving a query, the query specifying a subset of the set of data fields and a search range for each specified data field, and processing the query by checking each one of the index tables for being relevant for the execution of the query, one of the index tables being relevant if the one of the index tables is assigned to one of the specified data fields, storing the index table identifier for each relevant index table in a query execution table, sorting the query execution table in accordance with a predetermined ordered sequence of index table identifiers, executing the query using the index tables identified in the query execution table in the order given by the sorting of the query execution table.

9. The computer-implemented method of claim 8, further comprising determining the ordered sequence by determining the sizes of all index tables and sorting the index tables by size.

10. The computer-implemented method of claim 9, wherein the determination of the ordered sequence is performed at consecutive time intervals, wherein the duration of the time intervals is inversely proportional to the actual load of the database.

11. The computer-implemented method of claim 8, further comprising receiving a data structure as part of the query, the data structure containing data field names of at least some of the specified data fields, a search range for each one of the data field names and a Boolean term specifying a relation between the data field names, and further comprising transforming the data structure into a character string and using the character string for execution of the query.

12. The computer-implemented method of claim 9, further comprising receiving a mapping table as part of the query from a user interface, and mapping of a result returned by the query to one or more elements of the user interface in accordance with the mapping table.

* * * * *